(12) United States Patent
Myers et al.

(10) Patent No.: US 10,061,933 B1
(45) Date of Patent: Aug. 28, 2018

(54) SYSTEM AND METHOD FOR CONTROLLING THE POWER STATES OF A MOBILE COMPUTING DEVICE

(71) Applicant: BOOZ ALLEN HAMILTON INC., McLean, VA (US)

(72) Inventors: Gary Jason Myers, Fairfax, VA (US); Matthias Welsh, Washington, DC (US); Robert Wayne Knight, Kenmore, WA (US); Timothy Schaefer, Rochester, MN (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 15/865,933

(22) Filed: Jan. 9, 2018

(51) Int. Cl.
| | |
|---|---|
| *G06F 21/00* | (2013.01) |
| *G06F 21/62* | (2013.01) |
| *G06F 1/32* | (2006.01) |
| *G06K 19/07* | (2006.01) |
| *G06F 21/57* | (2013.01) |
| *G06F 21/60* | (2013.01) |
| *G06F 17/00* | (2006.01) |
| *H04L 29/06* | (2006.01) |
| *G06F 12/14* | (2006.01) |
| *G06F 1/00* | (2006.01) |

(52) U.S. Cl.
CPC .......... *G06F 21/62* (2013.01); *G06F 1/3203* (2013.01); *G06F 21/572* (2013.01); *G06F 21/575* (2013.01); *G06F 21/604* (2013.01); *G06K 19/0723* (2013.01)

(58) Field of Classification Search
None
See application file for complete search history.

(56) References Cited

U.S. PATENT DOCUMENTS

| | | | |
|---|---|---|---|
| 5,192,947 A | 3/1993 | Neustein | |
| 6,008,727 A | 12/1999 | Want et al. | |
| 7,769,394 B1 | 8/2010 | Zhu | |
| 8,806,616 B2 | 8/2014 | Buer et al. | |
| 9,311,496 B1* | 4/2016 | Dutch | G06F 21/604 |
| 9,848,291 B2 | 12/2017 | Myers et al. | |
| 2008/0005599 A1* | 1/2008 | Theocharous | G06F 1/3203 |
| | | | 713/300 |
| 2008/0058006 A1 | 3/2008 | Ladouceur | |
| 2013/0079037 A1 | 3/2013 | Dobyns | |
| 2014/0173314 A1* | 6/2014 | Min | G06F 1/3206 |
| | | | 713/323 |
| 2015/0067017 A1* | 3/2015 | Shah | H04L 65/4084 |
| | | | 709/202 |

(Continued)

FOREIGN PATENT DOCUMENTS

WO 2013011512 A1 1/2013

OTHER PUBLICATIONS

Extended European Search Reported dated Mar. 16, 2018, by the European Patent Office in corresponding European Patent Application No. 15841532.3 (8 pages).

*Primary Examiner* — Eric Chen
(74) *Attorney, Agent, or Firm* — Buchanan Ingersoll & Rooney PC

(57) ABSTRACT

An exemplary mobile computing device, including a memory device for storing a control policy defining a functional configuration of the mobile computing device; and a processor configured to place the mobile computing device in one of one of plural states based on a validation result of the control policy.

17 Claims, 7 Drawing Sheets

(56) References Cited

U.S. PATENT DOCUMENTS

2016/0048682 A1\* 2/2016 Gou .................. H04W 4/00
  726/22
2017/0303131 A1\* 10/2017 Myers ................ H04W 12/08

\* cited by examiner

SYSTEM AND METHOD FOR CONTROLLING THE POWER STATES OF A MOBILE COMPUTING DEVICE

FIELD

The present disclosure relates to a system and method for enabling and controlling the power states of a mobile computing device according to information received from a remote or external device.

BACKGROUND

Government and private organizations have invested millions of dollars into products and resources for preventing unauthorized access to personal, proprietary and/or classified data. Data security schemes and algorithms must be particularly robust when dealing with prevalence of mobile computing devices in use on an organization's network. Restricting access to data and files can be particularly important when the mobile computing devices are under the control of various users and are freely transported between public spaces and spaces controlled by the organization.

SUMMARY

An exemplary mobile computing device is disclosed comprising: a memory device for storing a control policy defining a functional configuration of the mobile computing device; and a processor configured to place the mobile computing device in one of one of plural states based on a validation result of the control policy.

An exemplary method of controlling a power state of a mobile computing device is disclosed, the mobile computing device having a memory device and a processor configured to execute the method via at least one of a plurality of programming modules, the method comprising: storing a control policy in the memory device, the control policy defining a functional configuration of the mobile computing device; retrieving the control policy from the memory device for validation; and place the mobile computing device in one of plural states based on whether the control policy is valid.

These and other features and advantages of particular embodiments of the system and method for location-based security will now be described by way of exemplary embodiments to which they are not limited.

BRIEF DESCRIPTION OF THE DRAWINGS

The scope of the present disclosure is best understood from the following detailed description of exemplary embodiments when read in conjunction with the accompanying drawings. The following figures are included in the drawings.

Figure 1:
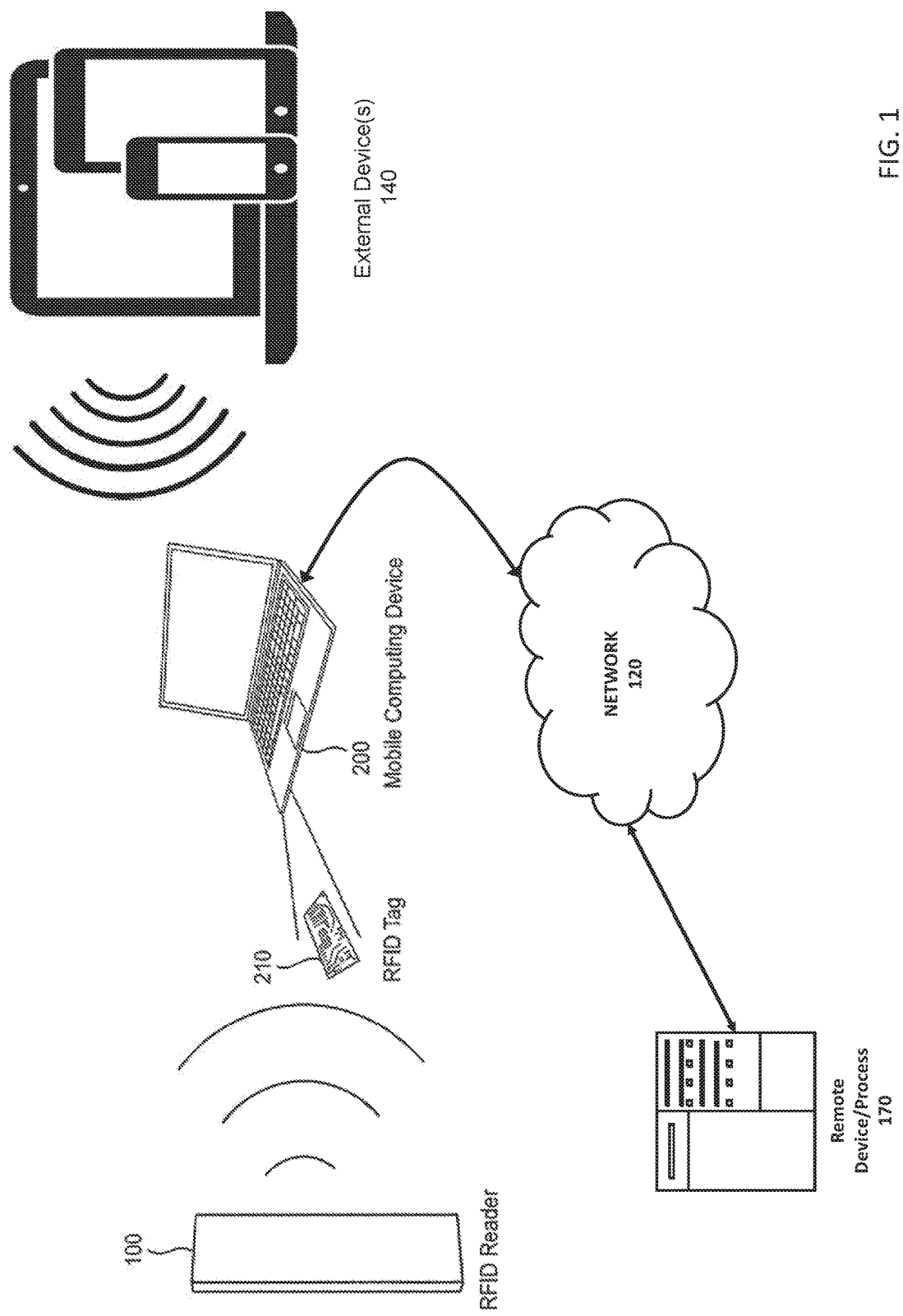
FIG. 1 illustrates a diagram of a system architecture that may be employed in accordance with an exemplary embodiment.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

This description provides exemplary embodiments only, and is not intended to limit the scope, applicability or configuration of the mobile computing device, system, and method for power interruption of the present disclosure. Rather, the ensuing description of the embodiments will provide those skilled in the art with an enabling description for implementing embodiments of the mobile computing device, system, and method of the present disclosure. Various changes may be made in the function and arrangement of elements without departing from the spirit and scope of the disclosure as set forth in the appended claims. Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

Exemplary embodiments of the present disclosure are directed to systems and methods for controlling the power states of a mobile computing device (e.g., computer or system) based on the validity of a control policy. The control policy specifies a functional configuration of the mobile computing device based on security requirements associated with a physical or geographic location within which the mobile computing device is operating or has moved into for operation. The mobile computing device can include any portable, movable, or otherwise transportable computing device. The mobile computing device can be configured with a boot control program that initializes and tests software and hardware components according to a first functional configuration. As will be disclosed in detail herein, a control policy can be used to initiate a second functional configuration of the mobile computing device according to operational and/or security requirements specified for the physical or geographic location. The mobile computing device can be configured to execute software for executing and retrieving the control policy from a storage location in a remote or external device. The control policy can include instructions for changing the functional configuration of the mobile computing device such that one or more software and/or hardware components of the mobile computing device 100 can be disabled or not initialized by the processor. Further, the control policy can specify a change in power state of the mobile computing device such that power is interrupted upon enforcement. Still further, the control policy could specify under certain operational and location specific conditions that the hard disk and/or non-volatile memory devices be wiped. The boot loader program is program code, which when executed by the processor allows the control policy stored to be accessed from memory and the validity of the control policy to be evaluated. The power state of the mobile computing device is controlled based on the results of the evaluation, where the current state of the mobile computing device is maintained, the mobile computing device is rebooted, the mobile computing device is moved into a powered off, or the mobile computing device is rebooted and a disk wipe is initiated.

Figure 2:
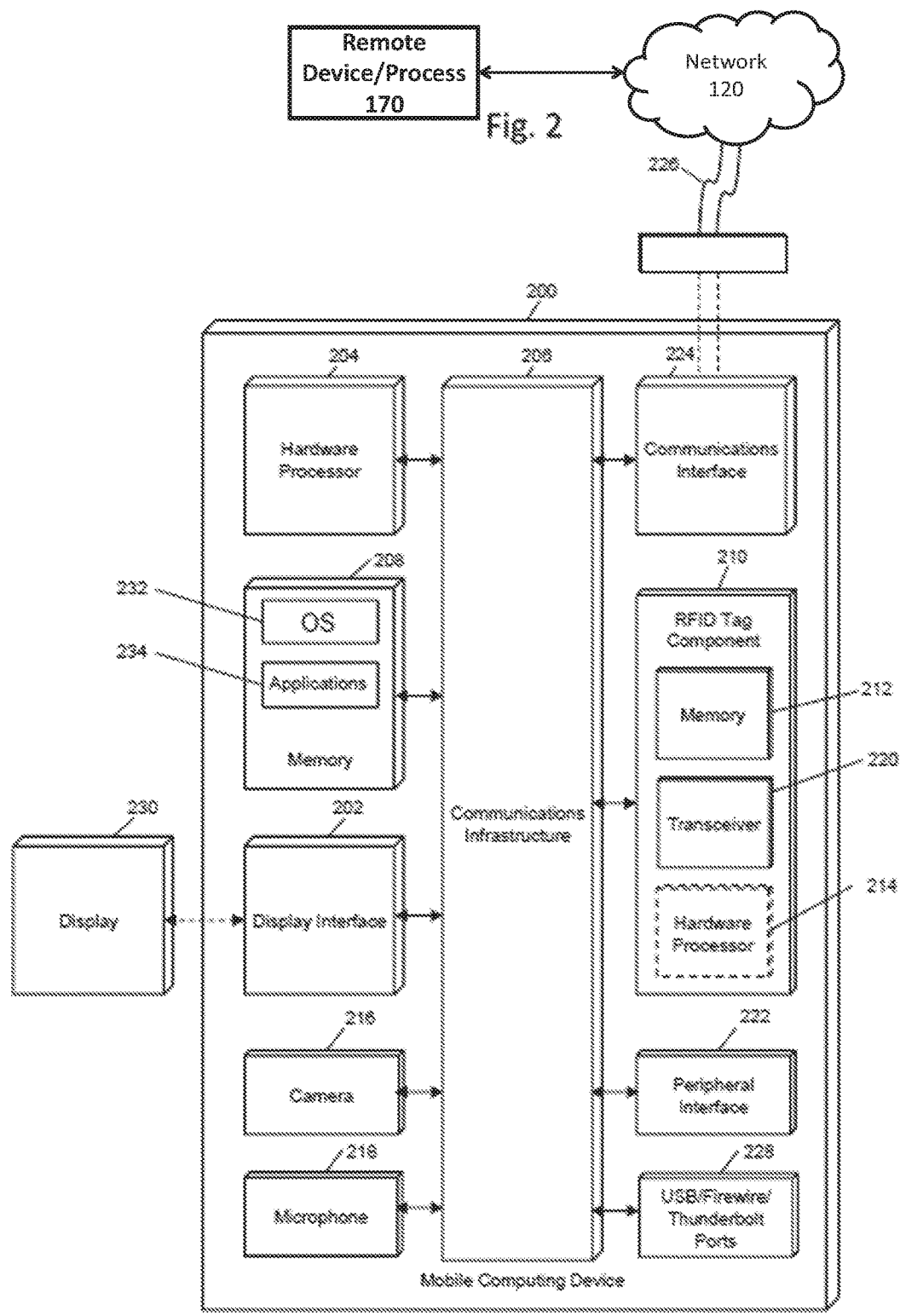
FIG. 2 is a block diagram illustrating the hardware architecture of a mobile computing device in accordance with an exemplary embodiment.

With reference to FIGS. 1 and 2, exemplary embodiments of the present disclosure provide a system and method of location-based security, in which RFID components 210 (e.g., RFID tags) removably or fixedly attached or affixed to a mobile computing device 200 comprise microcontrollers (e.g., at least one hardware processor), and the communications infrastructure 206 (e.g., internal and external serial buses) of mobile computing devices 200 exchange location information between the RFID components 210 and the firmware and operating system(s) 232 of the mobile computing device 200. As used herein, a mobile computing device 200 includes at least one hardware processor 204 configured to execute computer-readable programs and an operating system 232 tangibly recorded on a non-transitory computer-readable recording medium ("memory") 208 (e.g., ROM, hard disk drive, optical memory, flash memory, etc.). Examples of a mobile computing device 200 include a laptop, tablet computer, smartphone, etc. as known in the art.

FIG. 1 is a block diagram of components of a system for location-based security according to an exemplary embodiment of the present disclosure. In FIG. 1, the mobile computing device 200 is shown as having an RFID component 210 affixed thereto. The RFID component 210 may be removably or fixedly attached or affixed to the mobile computing device 200. For example, the RFID component 210 may be comprised within the housing containing the electronic circuitry of the mobile computing device 200. In an exemplary embodiment, the RFID component 210 may have its own hardware processor 214 separate from the hardware processor(s) of the mobile computing device 200. In addition, the RFID component 210 can have its own non-transitory memory 212 (e.g., ROM, hard disk drive, optical memory, flash memory, etc.) separate from the memory 208 of the mobile computing device 200, and a transceiver 220. In an exemplary embodiment, the RFID component 210 does not have its own hardware processor 214, but contains the memory 212 and the transceiver 220. The RFID component 210 may be passive, active, or battery-assisted passive. An active RFID component 210 has an on-board battery and periodically transmits a signal containing a data message (the message can include, e.g., identification information of the RFID component, etc.). A battery-assisted passive RFID component 210 has a small battery on board and is activated when in the presence of an RFID reader 100. A passive RFID component 210 is cheaper and smaller because it has no battery; instead, the RFID component 210 uses the radio energy transmitted by the RFID reader 100. The RFID component 210 contains at least two parts: an integrated circuit for storing and processing information, modulating and demodulating a radio-frequency (RF) signal, collecting DC power from the incident reader signal, and other specialized functions; and a transceiver 220 (e.g., antenna) for receiving and transmitting the signal. In an exemplary embodiment, the transceiver 220 can include two antennas in different polarizations such as linear and circular or horizontal and vertical. A single antenna can also be used. The RFID component 210 can operate, for example, in a frequency range between 860 and 960 MHz. The sensitivity of the antenna is important to the operation of the RFID component 210, and a minimum receive gain of the antenna greater than −2 dB should be maintained to ensure proper operation. In an exemplary embodiment, the antenna provides a roughly omni-directional radiation pattern. Due to regional banding of the −900 MHz ISM frequency space, the antenna(s) may be regionally designed. For instance, the North American ISM band is 902-928 MHz. With a transmitter at 28 dBm complying with FCC and UHF RFID Gen2 Specifications, this should yield a free space range of approximately 20 meters.

The RFID component 210 information (i.e. tag information) is stored in a non-volatile memory, e.g., memory 212. The RFID component 210 includes either fixed or programmable logic for processing the transmission and sensor data, respectively. In an exemplary embodiment, the RFID component 210 includes an Impinj MonzaX-8K Dura RFID integrated circuit or similar integrated circuit. FIG. 1 illustrates only one RFID reader 100 and RFID component 210 for clarity of illustration. However, it is to be understood that several RFID readers 100 may be equipped in a room or other area to which the mobile computing device may be carried. An RFID reader 100 transmits a radio signal, which may be encoded, to interrogate the RFID component 210. The RFID component 210 receives the message from the RFID reader 100 and then responds with its identification information. The RFID reader 100 can include a non-transitory memory device that can store the proximity signal (which can include the location data and/or a control policy), a hardware processor (e.g., CPU), and a transceiver.

The RFID reader(s) 100 send a proximity signal (e.g., location-related information includes, for example, geographic coordinates, configured zones, and/or proximity information)) to the RFID component 210 embedded within or affixed to the mobile computing device 200, indicating the defined physical location of the RFID reader(s) 100 and/or the mobile computing device 200. The location information can be transmitted to the RFID component 210 while the mobile computing device 200 is in both the powered-on and powered-off states. The message stored in the RFID component's memory 212 is accessed by the hardware processor 214 of the RFID component 210. The hardware processor 214 serves three functions: 1) processes the location information provided by the RFID component 210 against corresponding control or management policies to determine the appropriate power state for the mobile computing device 200; 2) communicate with the power controls of the mobile computing device 200 to manage power states (e.g., force power off, enable power on, and disable power on); and 3) pass the location information to the mobile computing device's serial buses 206. In an exemplary embodiment, the RFID reader 100 can adjust its transmission frequency to avoid standard frequencies.

FIG. 2 is a block diagram illustrating a mobile computing device 200 architecture in accordance with an exemplary embodiment. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A hardware processor device as discussed herein may be a single hardware processor, a plurality of hardware processors, or combinations thereof. Hardware processor devices may have one or more processor "cores." The terms "computer program medium," "non-transitory computer readable medium," and "computer usable medium" as discussed herein are used to generally refer to tangible media such as a memory device 208 and a memory device 212.

Various embodiments of the present disclosure are described in terms of this exemplary mobile computing device 200. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Hardware processors 204 and 214 may be special purpose or general purpose processor devices. The hardware processor device 204 may be connected to a communication infrastructure 206, such as a bus, message queue, network, multi-core message-passing scheme, etc. The network may be any network suitable for performing the functions as disclosed herein and may include a local area network (LAN), a wide area network (WAN), a wireless network (e.g., Wi-Fi) such as Bluetooth, a mobile communication network, a satellite network, the Internet, fiber optic, coaxial cable, infrared, radio frequency (RF), networks using the global positioning system (GPS) platform, networks using ultra-wideband or pulse radio, any other suitable communication network, or any combination thereof. Other suitable network types and configurations will be apparent to persons having skill in the relevant art. The mobile computing device 200 may also include a memory 208 (e.g., random access memory, read-only memory, etc.), and may also include a memory 212. The memory 208 and the memory 212 may be read from and/or written to in a well-known manner. In an exemplary embodiment, the memory 208 and the memory 212 (and memory 302) may be non-transitory computer readable recording media.

Data stored in the mobile computing device 200 (e.g., in the memory 208 and the memory 212) may be stored on any type of suitable computer readable media, such as optical storage (e.g., a compact disc, digital versatile disc, Blu-ray disc, etc.), magnetic tape storage (e.g., a hard disk drive), or solid-state drive. An operating system 232 and one or more applications 234 can be stored in the memory 208.

In an exemplary embodiment, the data may be configured in any type of suitable database configuration, such as a relational database, a structured query language (SQL) database, a distributed database, an object database, etc. Suitable configurations and storage types will be apparent to persons having skill in the relevant art.

The mobile computing device 200 may also include a communications interface 224. The communications interface 224 may be configured to allow software and data to be transferred between the mobile computing device 200 and external or remote devices. Exemplary communications interfaces 224 may include a modem, a network interface (e.g., an Ethernet card), a communications port, a PCMCIA slot and card, etc. Software and data transferred via the communications interface 224 may be in the form of signals, which may be electronic, electromagnetic, optical, or other signals as will be apparent to persons having skill in the relevant art. The signals may travel via a communications path 226, which may be configured to carry the signals and may be implemented using wire, cable, fiber optics, a phone line, a cellular phone link, a radio frequency link, etc.

Computer program medium and computer usable medium may refer to memories, such as the memory 208 and the memory 212, which may be memory semiconductors (e.g., DRAMs, etc.). These computer program products may be means for providing software to the mobile computing device 200. Computer programs (e.g., computer control logic) may be stored in the memory 208 and/or the memory 212. Computer programs may also be received via the communications interface 224. Such computer programs, when executed, may enable mobile computing device 200 to implement the present methods as discussed herein. In particular, the computer programs, when executed, may enable hardware processor device 204 to implement the method illustrated by FIGS. 4-7, or similar methods, as discussed herein. Accordingly, such computer programs may represent controllers of the mobile computing device 200. Where the present disclosure is implemented using software, the software may be stored in a computer program product or non-transitory computer readable medium and loaded into the mobile computing device 200 using a removable storage drive or communications interface 224.

The mobile computing device 200 may also include various hardware devices, such as a camera 216, a microphone (not shown), a power controller 218, a peripheral interface 222, and input/output ports 228 such as USB, firewire, thunderbolt ports, etc. As described in greater detail below, the RFID component 210 may be located within and integrated with the mobile computing device 200, or the RFID component 210 can be external to the mobile computing device 200 and connected thereto by a signal transmission means such as a wire(s), wireless communications, etc.

Lastly, the mobile computing device 200 may also include a display interface 202 that outputs display signals to a display unit 230, e.g., LCD screen, plasma screen, LED screen, DLP screen, CRT screen, or other suitable display device as desired.

The operating system(s) 232 of the mobile computing device 200 can receive RFID-based location information from either the serial buses 206 directly, if running as a native operating system 232 or as a pass-through from the hypervisor (not shown), if running on a guest virtual machine. The location-based security techniques of the present disclosure integrate with the operating system(s) 232 to control access to device hardware and device power states using the defined policy rules. Access to one or more applications 234 and one or more files stored or running on the operating system(s) 232 are also enabled or disabled using the device management functionality of the location-based security system and method of the present disclosure. A file can be, for example, a document, picture, video, database records, etc.

In an exemplary embodiment shown in FIG. 2, the mobile computing device 200 includes the memory device 208 having computer-readable instructions tangibly recorded thereon. The mobile computing device 200 can also include a hardware processor 204 configured to execute the computer-readable instructions recorded on the memory device 208. The mobile computing device 200 can also include an RFID component 210 that includes a transceiver 220 (e.g., an antenna) configured to receive a proximity signal from at least one RFID reader 100 when the RFID component 210 is within a predetermined range (e.g., within a couple feet or meters) of the at least one RFID reader 100. The predetermined range can be configured based on (1) the processing and/or telecommunication capabilities of the mobile computing device 200, RFID component 210 and/or RFID reader(s) 100, and/or (2) based on selectable distances (e.g., 10 feet, 20 feet, 30 feet) for specific control objectives, and/or (3) location restrictions such as the physical size of a room, building, or segment of a building (e.g., the second floor of the building). The mobile computing device 200 can also include a memory device 212 configured to store the proximity signal. In an exemplary embodiment, the hardware processor 204 is configured to, upon executing the instructions recorded on the memory device 208, control at least one operation of the mobile computing device 200 in accordance with the proximity signal received by the transceiver 220 of the RFID component 210 from the at least one RFID reader 100.

The memory device 208 can be in the form of a hard disk, optical disk, flash memory (e.g., EEPROM, SSN, NAND), or any other suitable memory device including memory chips as desired. The memory device 208 can include one or more devices having addressable locations for storing data related to applications, software, and information, and/or data related to software and hardware components of the mobile computer device.

Figure 3:
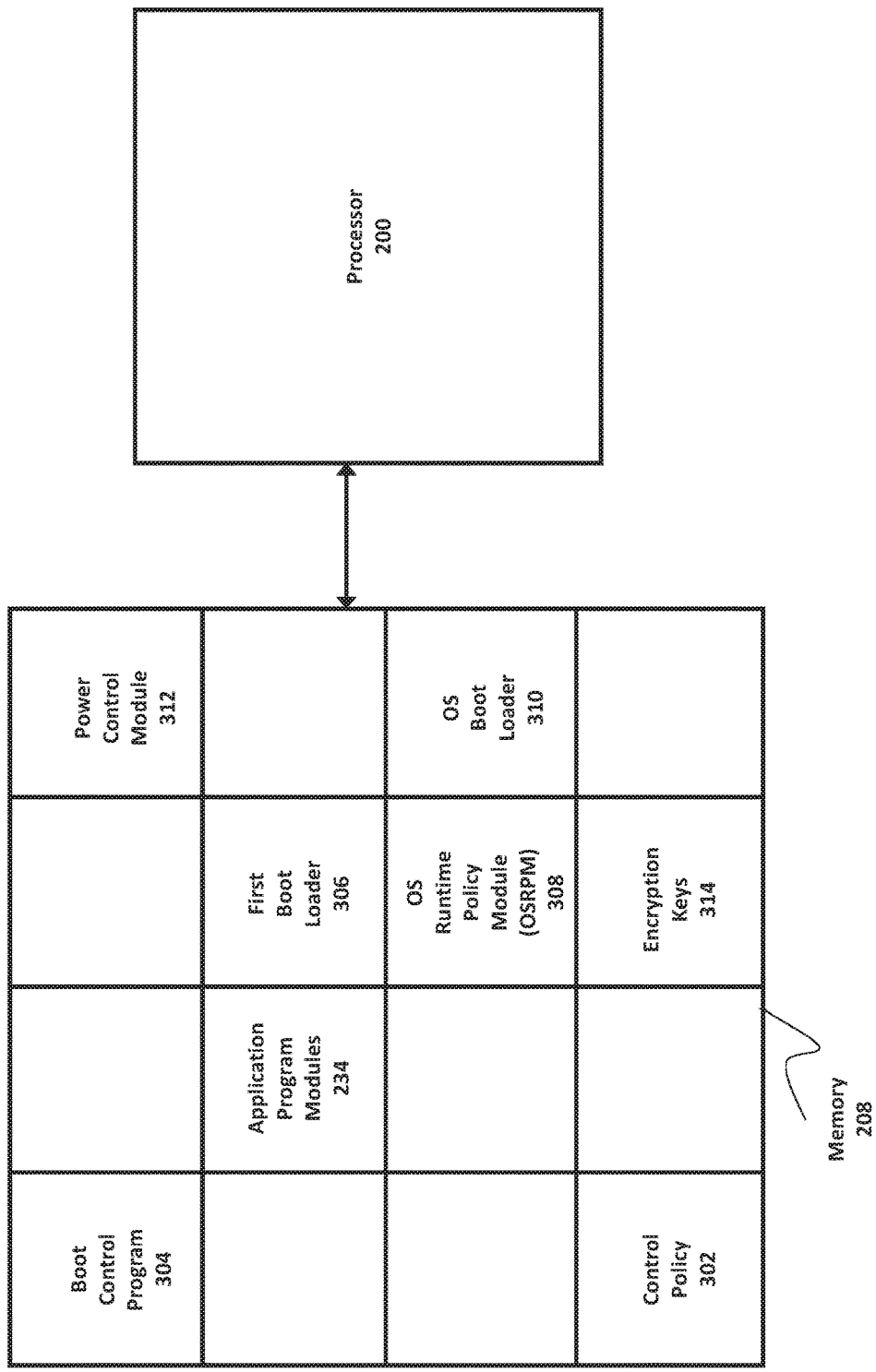
FIG. 3 is a block diagram illustrating a memory device in accordance with an exemplary embodiment of the present disclosure.

FIG. 3 is a block diagram illustrating a memory device in accordance with an exemplary embodiment of the present disclosure.

As shown in FIG. 3, the memory device 208 can store a boot control program 304 (e.g., firmware) according to a Basic Input/Output System (BIOS) format or Unified Extensible Firmware Interface (UEFI) specification; a control policy 302 for access by the mobile computing device 200 during system boot; a first bootloader (e.g., firmware application) 306, an operating system runtime policy module (OSRPM) (e.g., software application) 308, an operating system (OS) boot loader (e.g., software application) 310, a power control module 312, encryption keys 314, and application program modules (e.g., applications, software modules, etc.) 234.

The first bootloader 306 is the first program (e.g., firmware application) in the boot sequence of the boot control program 304. The first bootloader is initiated at system boot and is an application that configures the processor 204 to retrieve the control policy from a memory device located on the computing device or from a device/process connected to a network and evaluates the control policy for validity. The OS Runtime Policy Module 308 is a program module initiated by the computer operating system when the mobile computing device is powered on and configures the processor 204 to retrieve the control policy from the memory device 208, 212 of the mobile computing device or from a device/process connected to the network and evaluate its validity. The OS boot loader 310 is a program module (e.g., software application) initiated by the first bootloader 306 at system boot for causing the processor 204 to execute the computer's native OS. The power control module 312 is program code initiated by the OSRPM 308 for monitoring communication between the power controller 218 and the OSRPM 308. The encryption keys are provided for decrypting the control policy when received from the RFID reader 100 or over the network 120.

In an exemplary embodiment, the hardware processor 204 is configured to control at least one of: (1) at least one hardware component (e.g., memory device 208, display interface 202, camera 216, microphone, peripheral interface 222, communications interface 224, ports 228, etc.) of the mobile computing device 200; (2) at least one operating system 232 recorded on the memory device 208; (3) at least one hypervisor recorded on the memory device 208; and (4) at least one application program 234 executable on the mobile computing device 200.

In an exemplary embodiment, the proximity signal includes a control policy including identifications of operations of the mobile computing device 200 that are performable (e.g., by the mobile computing device 200). For example, according to the control policy, the hardware processor 204 is configured to enable or disable access to at least one of an executable application 234 stored in the memory device 208, a file stored in the memory device 208, at least one operating system 232 of the mobile computing device 200, and a peripheral hardware component (e.g., external hard drive, server, external disk drive, etc.) with which the mobile computing device 200 is configured to communicate. In addition, the control policy provides instructions that configure the hardware processor 204 for placing the mobile computing device into a specified power state. That is, when the mobile computing device 200 is within a certain range of the RFID reader 100, the RFID reader 100 sends the proximity signal, which includes the control policy, to the RFID component 210. Because the control policy identifies a power state along and in addition which operations, devices, files, or applications can be accessed and/or used by the mobile computing device 200, the hardware processor 204 is able to control the computer to be powered off, powered on, or placed in sleep mode or hibernation mode, and control the operations and/or access to devices, files, applications, etc. of the mobile computing device 200 in accordance with the control policy that was received.

According to an exemplary embodiment of the present disclosure, the mobile computing device 200 can be placed into a brick state when the proximity signal is no longer received by the transceiver 220 of the RFID component 210, or an operating signal, which for this embodiment can be in the form of a ping or other suitable monitoring signal, is no longer received by the communications interface 224 or peripheral interface 222 of the mobile computing device 200. In the brick state, the computing device will terminate execution of the first computer-readable instructions such that the mobile computing device 200 no longer receives input from peripheral devices or installed components and suspends execution of any processes. According to an exemplary embodiment, termination of execution of the first computer-readable instructions can include initiating a reboot of the hardware processor 204, such that when the control policy cannot be validated the mobile computing device 204 is powered off.

In an exemplary embodiment, a server can store multiple control policies for individual RFID readers 100 and/or mobile computing devices 200, and each control policy can be sent to the appropriate RFID reader 100 to which the control policy applies. The control policies can be updated on the server, and the updated control policies can be pushed by the server to the appropriate RFID readers 100. When an RFID reader 100 receives its intended control policy, it is saved in the memory 302 of the RFID reader 100 where it can subsequently be transmitted to the RFID component 210 of the mobile computing device 200 by the transceiver 304.

In an exemplary embodiment, the proximity signal includes location-related data indicating a current physical location of at least one of the RFID component 210 and the at least one RFID reader 100. In an exemplary embodiment, the location-related data can identify the reader that transmitted the proximity signal (by name, MAC ID, serial number, code, room name, etc.). In an exemplary embodiment, the location-related data can identify a defined zone (i.e. an area of space in which the mobile computing device 200 is located). In an exemplary embodiment, the location-related data can be geographical coordinates. For example, an RFID reader 100 can be disposed on an exterior of the building or in an interior of the building such as a room, walkway, or other space having a security specification or requirement with respect data access or communication. According to an exemplary embodiment, the RFID reader 100 can be disposed on or in a mobile or portable object such as a vehicle or portable computing device.

In an exemplary embodiment, the memory device 208 has recorded thereon a control policy for the mobile computing device 200, the control policy including identifications of operations of the mobile computing device 200 which are performable based on the physical location of the mobile computing device 200. The hardware processor 204 is configured to compare the location-related data with the control policy, and determine which operations of the mobile computing device 200 are permitted to be performed based on the comparison.

Based on the comparison of the location-related data with the control policy, the hardware processor 204 is configured to control access to at least one hardware component (e.g., memory device 208, display interface 202, camera 216, microphone, peripheral interface 222, communications interface 224, ports 228, etc.) of the mobile computing device 200. This control also extends to enabling or disabling access to at least one of an executable application 234, 334 stored in the memory device 208, a file stored in the memory device 208, at least one operating system 232 of the mobile computing device 200, and a peripheral hardware component with which the mobile computing device 200 is configured to communicate.

In an exemplary embodiment, the transceiver 220 of the RFID component 210 is configured to receive an update signal from at least one RFID reader 100, the update signal containing an update to at least one of the identifications included in the control policy recorded on the memory device 208. The hardware processor 204 is configured to update the control policy recorded in the memory device 208 in accordance with the update contained in the update signal.

According to another exemplary embodiment, the communications interface 224 of the mobile computing device 200 is configured to receive the update signal from at least one remote device/process 170 connected to the network 120. The hardware processor 204 under control of the OSRPM is configured to update the control policy 302 recorded in the memory device 208 in accordance with the update contained in the update signal.

In an exemplary embodiment, at least one of the control policy and the proximity signal are encrypted. Thus, the location data received from the RFID reader 100 or over the network 120 can be encrypted. For example, for RF communication the control policy and/or the proximity signal can be encrypted using an AES-256 GCM algorithm and signed with an ECDSA Curve P-385 signature or with a similar encryption scheme. In an exemplary embodiment, certificates for the ECDSA process are distributed as part of the system configuration and are assigned based on organizational region. Policy signatures can be generated, for example, on the message bytes 0 to 927. In an exemplary embodiment, encryption is performed on the entirety of the message bytes 0 to 1024 after the signature is generated.

Pre-distributed key material unique to each RFID tag is stored in the device TPM and on a server. The key material is hashed with a NONCE that is part of the RFID transmission to generate individual session keys for each of the written policies. In an exemplary embodiment, a single policy can be used for both the UEFI/firmware of the mobile computing device 200 and operating system 232 of the mobile computing device 200, so both have cryptographic capabilities capable of decrypting the entire message and verifying the signature. Key storage can be handled in a TPM 2.0 capable TPM. In an exemplary embodiment, all messages of the RFID component 210 except for the NONCE(s) are encrypted, for example using the scheme above.

The messages used in the present disclosure can be stored on the memory device 212 of the RFID component 210. In an exemplary embodiment, the memory device 212 is 1,024 bytes in storage size, and stores the control policy along with a CRC16, ECDS curve P-384 generated signature and a 512 bit random NONCE unique to that configuration.

For network communication, the update can be encrypted using symmetric key or public key schemes, along with algorithms including message authentication codes or digital signatures. Encryption keys 314 stored in the memory device 208 are provided for decrypting the control policies upon retrieval from the RFID reader 100, external devices 140, and remote devices/processes 170

In an exemplary embodiment, as shown in FIG. 1, a system includes the mobile computing device 200, at least one least one RFID reader 100, and the RFID component 210. The at least one RFID reader 100 is configured to communicate wirelessly with the RFID component 210 of the mobile computing device 200 and transmit the proximity signal to the RFID component 210 of the mobile computing device 200 when the RFID component 210 is within the predetermined range. In an exemplary embodiment, at least one server (not shown) is configured to transmit the update signal to the RFID reader 100 for updating the control policy recorded on the memory device 208 when the mobile computing device 200 is in communicative range with the RFID reader 100.

In an exemplary embodiment, the memory device 212 has recorded thereon computer-readable instructions and a control policy for the mobile computing device 200, the control policy including identifications of operations of the mobile computing device 200 which are performable based on the location-related data of the received proximity signal.

FIG. 1 also shows another exemplary embodiment in which the system includes the mobile computing device 200, a network 120, an external device 140, and at least one remote device/process 170 connected to the network 120. The mobile computing device 200 can be connected to the network 120 via the communications interface 224. As already discussed, the communication interface 224 can provide wireless or wired connection to the network 120, which is used for accessing and receiving the control policy from the device/process 170. The received control policy is stored in the memory device for later retrieval and enforcement by the hardware processor 208 under control of the appropriate application or program code.

In an exemplary embodiment, the RFID component 210 includes a hardware processor 214 configured to execute computer-readable instructions recorded on the memory device 212, compare the location-related data with the control policy, determine which operations of the mobile computing device 200 are permitted to be performed based on the comparison, and generate an operation signal identifying the operations of the mobile computing device 200 which are determined to be performable. The RFID component 210 is configured to transmit the operation signal to the hardware processor 204 of the mobile computing device 200, and the hardware processor 204 is configured to control at least one operation of the mobile computing device 200 in accordance with the operation signal received from the transceiver 220 of the RFID component 210.

According to an exemplary embodiment, the hardware processor 204 is configured to control a power state of the mobile computing device 200 based on an operation signal received from the transceiver 220 of the RFID component 210 or from the device/process 170 on the network 120. The hardware processor 204 is configured to retrieve the control policy from a remote/process device 170 on the network, store the control policy in the memory device (e.g., Computer Memory 208 or RFID Memory 212), and evaluate the control policy for expired, corrupted, or malicious instructions. Based on the evaluation results, the hardware processor 204 enforces the power state instructions provided in the control policy.

In an exemplary embodiment shown in FIG. 1, a system includes, for example, the mobile computing device 200, at least one RFID reader 100, and the RFID component 210. The at least one RFID reader 100 is configured to communicate wirelessly with the RFID component 210 of the mobile computing device 200 and transmit the proximity signal to the RFID component 210 of the mobile computing device 200 when the RFID component 210 is within the predetermined range. At least one server is configured to transmit the update signal to the at least one RFID reader 100 for updating the control policy recorded in the memory device 208 when the mobile computing device 200 is in communicative range with the at least one RFID reader 100.

Figure 4:
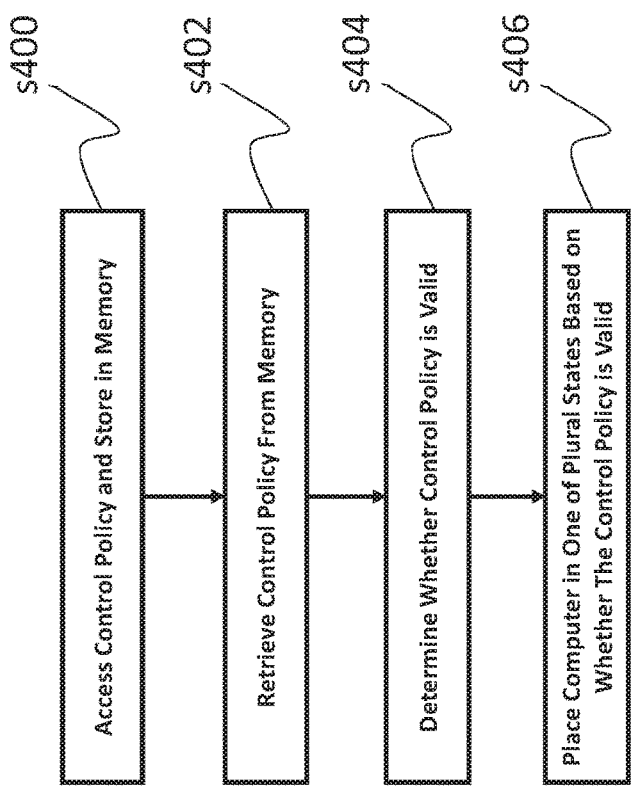
FIG. 4 illustrates a method of controlling a power state of a mobile computing device in accordance with an exemplary embodiment of the present disclosure.

FIG. 4 illustrates a method of controlling a power state of a computer in accordance with an exemplary embodiment of the present disclosure. The method steps are performed by the hardware processor 204 under the control of one or more of the native OS 232, applications 234, or program code stored in the memory device 208. As provided in the details that follow, one or a combination of the program modules can control the hardware processor 204 to manage or control the power states of the mobile computing device 200 when the mobile computing device 200 is in a powered on state or a powered off state and based on triggers received from a stand-alone external device 140 or received from an remote device/process 170 over the network 120.

Figure 5:
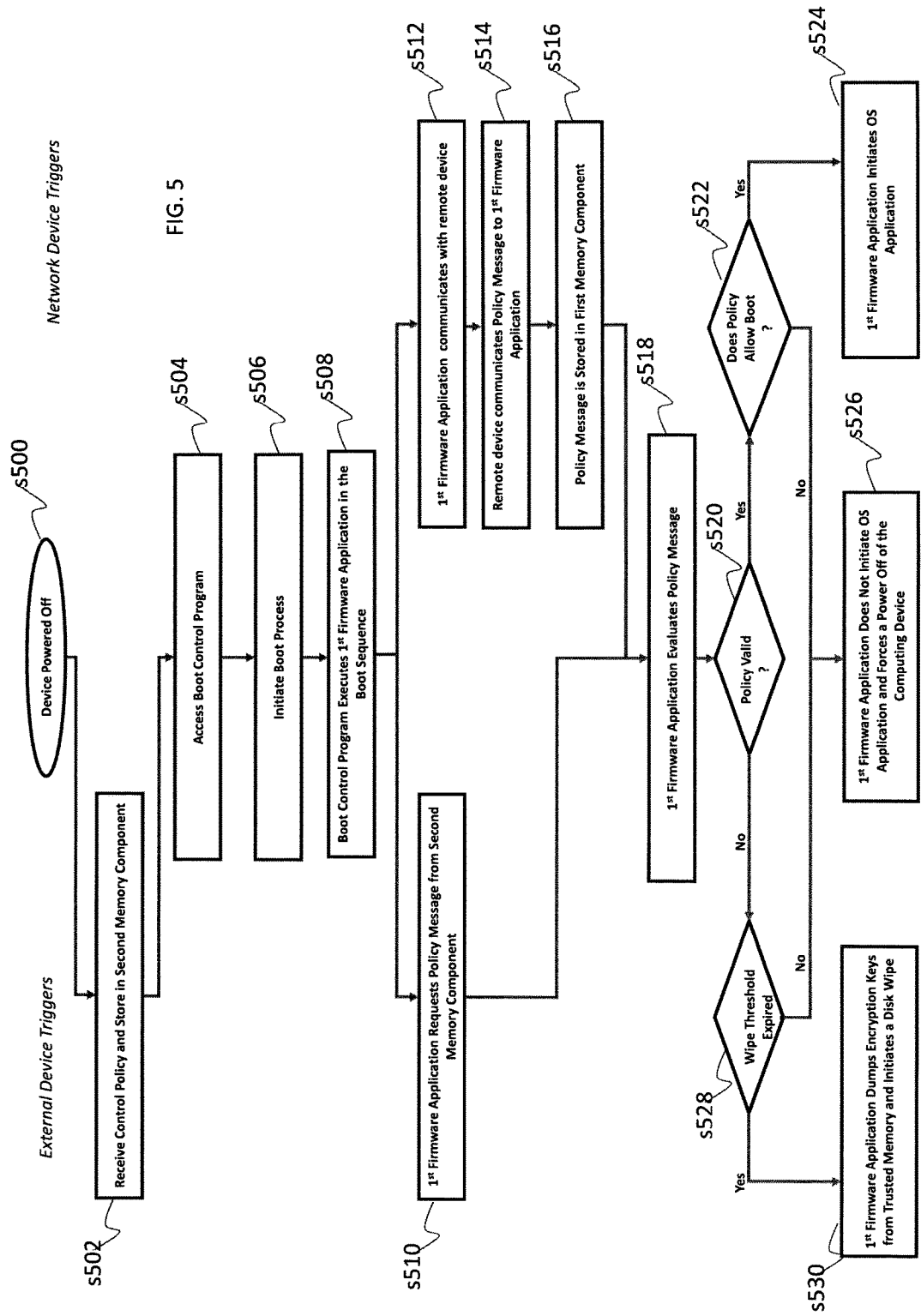
FIG. 5 illustrates the method of FIG. 4 for a mobile computing device in a powered off state in accordance with an exemplary embodiment of the present disclosure.
Figure 6:
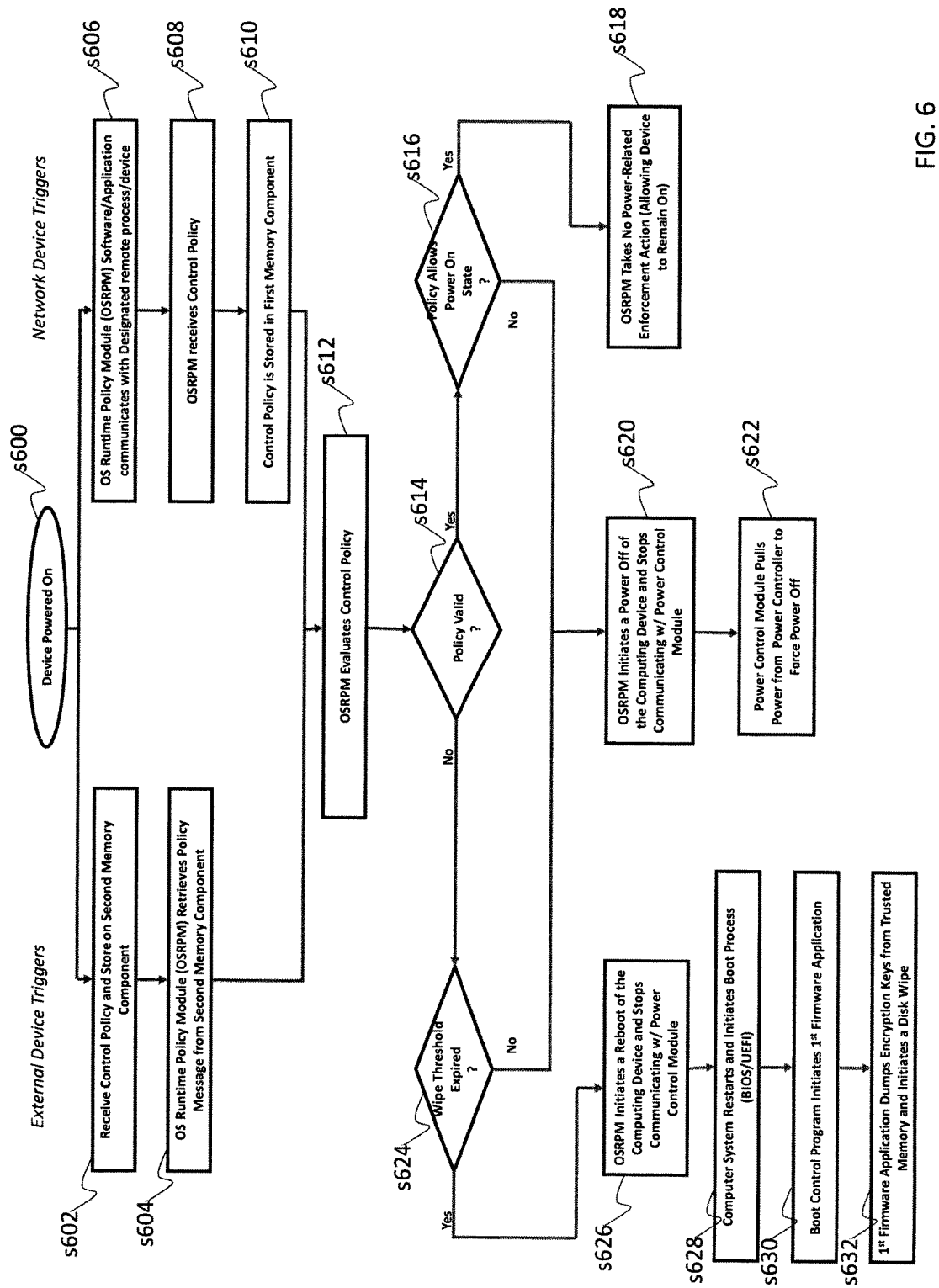
FIG. 6 illustrates the method of FIG. 4 for a mobile computing device in a powered on state in accordance with an exemplary embodiment of the present disclosure.

As shown in FIG. 4, the hardware processor 208 accesses the control policy 302 and stores the control policy in memory (step 400 ("s400")). Control policy access can be triggered by receipt of a proximity signal, which includes the control policy, from an RFID reader 100 or receipt of an update or control signal from an external device 140, or a remote device/process 170 connected to a network. The hardware processor 208 retrieves the control policy 302 from memory (s402) and determines whether the control policy 302 is valid (s404). At s406, the processor places the mobile computing device in one of plural states based on whether the control policy is valid. FIGS. 5 and 6 illustrate exemplary variations of the general process of FIG. 4 based on whether the mobile computing device 200 starts in a powered on or powered off state. In addition these processes can be initiated based on external or network triggers, such as an update or control signal received by the hardware processor 204 via the first bootloader 304 or the OSRPM 308. The external trigger can involve communication of the control policy between the RFID component 210 of the mobile computing device 200 and an RFID reader 100. The network trigger can involve communication of the control policy between the mobile computing device 200 and a remote device/process 170 over a network 160.

The exemplary methods illustrated in FIGS. 5 and 6 will first be described for an exemplary mobile computing device 200 configured for controlling the power state based on an external trigger such as communication of an update signal, operation signal, or the control policy 302 via an RFID reader 100.

As shown in FIG. 5, the RFID component 210 receives the control policy 302 from an RFID reader 100 and stores the control policy in RFID memory 212 (s502). The control policy 302 is included in a proximity signal received by the transceiver 220 of the RFID component 210 from the RFID reader 100. Receipt and storage of the control policy can include decrypting the control policy prior to storage using the encryption keys 314 stored in memory 208. The RFID transceiver 220 receives the control policy 302 when the RF signal emitted by the RFID reader 100 meets at least a threshold power level. If the RFID component 210 is in proximity of plural RFID tags 180, the RFID transceiver 220 selects the RF signal having the highest signal level, which represents the RFID reader 100 closest in proximity to the RFID component 210.

When the mobile computing device 200 is turned on, the hardware processor 208 accesses the boot control program 304 stored in memory 208 (s504) and initiates the boot process (s506). During a boot sequence the hardware processor 208 executes a first bootloader 306 (s508) for retrieving the control policy 302 from the RFID memory 212 (s510) and evaluating it for expired, corrupted, or malicious instructions (s518). The evaluation process determines whether the control policy 302 is valid. By executing the first boot loader 306 the hardware processor 208 is configured to evaluate various properties of or information contained in the control policy 302 including, for example, information identifying a physical location for enforcement of the control policy 302, a date or date range of enforcement, a user or device identifier against which the policy is to be enforced, formatting of the control policy 302, syntax, and/or various other attributes or parameters of the control policy 302 as desired. The information and/or properties of the control policy 302 can be compared with verified values to determine whether the control policy 302 has expired, is corrupted, or is malicious (e.g., execution of the control policy may result in an adverse condition or event in the mobile computing device or network).

If the evaluation results in a valid control policy 302 (s520), the hardware processor 208 under the control of the first bootloader 306 determines whether the valid control policy 302 allows boot up of the mobile computing device (s522). If the boot up of the mobile computing device is allowed, the first bootloader 306 controls the hardware processor 208 to initiate the OS bootloader 210 (s524). On the other hand, if the hardware processor 208 determines that boot up of the mobile computing 200 is not allowed, the first bootloader 306 does not initiate the OS bootloader 310 controls the hardware processor 208 to interrupt power and force a power off of the mobile computing device 200 (S526).

If the evaluation results in the control policy 302 being found not valid, the hardware processor 208 next determines whether a wipe threshold has expired (s528). If the wipe threshold is exceeded, the hardware processor 208 is controlled by the first bootloader 306 to dump the encryption keys 214 from trusted memory and initiate a disk wipe (s530). On the other hand, if the wipe threshold is not expired, the hardware processor 208 controls the power controller 218 to enter a power off state (s526).

As shown in FIG. 6, the mobile computing device 200 is in the powered on state (s600). At s602, the RFID component 210 receives the control policy 302 from an RFID reader 100 and stores the control policy in RFID memory 212. As already discussed, access to the control policy 302 by the RFID component 210 is triggered by receipt of the proximity signal from the RFID reader 100. Receipt and storage of the control policy can also include performing a decryption process using the encryption keys 314 stored in memory 208. The OSRPM 208 controls the hardware processor 208 to retrieve the control policy from the RFID memory (s604) and evaluate the control policy for expired, corrupted, or malicious instructions to determine its validity (s612, s614). The validity determination performed by the OSRPM is the same determination performed by the first bootloader 306 in the method of FIG. 5. If under the control of the OSRPM the hardware processor 208 determines that the control policy 302 is valid (s614), the hardware processor 208 next evaluates the control policy 302 to determine whether it allows a power ON state of the mobile computing device 200 (s616). If the control policy 220 allows the mobile computing device 200 to be in a power ON state, the hardware processor 208 maintains the current state of the mobile computing device 200 (e.g., powered on state) and does not initiate a power interrupt (s618). On the other hand, if the control policy 302 does not allow the power on state the hardware processor 208, under the control of the OSRPM 208, initiates a power interrupt and controls the power controller 218 to enter a power off state (s620). In addition, the communication between the OSRPM 208 and the power control module 312 stops. The hardware processor 208 forces the power controller 218 to power off via the power control module 312 (s622).

If the control policy is not valid, the hardware processor 208 (s614), under control of the power control module 312, determines whether the wipe threshold is expired (s624). If the wipe threshold is expired, the hardware processor 208 under the control of the OSRPM 208 initiates a reboot of the mobile computing device 200 and the OSRPM 208 stops communication with the power control module 312 (s626). Upon reboot, the hardware processor 208 executes the boot control program 304 (s628). Under control of the boot control program 204, the hardware processor 208 initiates the first boot loader 206 in the boot sequence (s630). Under control of the first bootloader 306, the hardware processor 204 dumps encryption keys 234 from trusted memory and initiates a disk wipe (s632).

According to an exemplary embodiment, the external trigger can be a signal, which includes the control policy that is received via the communications interface 224, peripheral interface 222, USB/Firewire/Thunderbolt Ports 228, the camera 216, or other manner of connecting to an external device 140. The control policy when received can be decrypted and stored in memory device 208 or other suitable memory device in or connected to the mobile computing device 200.

The processes of FIGS. 5 and 6 will now be described for an exemplary mobile computing device 200 configured for controlling the power state based on a network trigger such as communication of the control policy over a network 120 via a remote device/process 170.

As shown in FIG. 5, the mobile computing device 200 starts in a powered off state (s500). Upon power up, the hardware processor 208 initiates the boot process by executing boot control program 304 and initiates the first bootloader 306 as already discussed in s502 to s508. At s512, the hardware processor 208 under the control of the first bootloader 306, initiates communication over the network 120 with a remote device/process 170. The communication with the network 120 is established via the communication interface 224, for example, or other suitable interface provided on the mobile computing device 200. The mobile computing device 200 receives, receives the control policy 302 from the remote device/process 170 via the communication interface 224 (s514) and stores the control policy 302 in the memory device 208 (s516). Under control of the first bootloader 306, the hardware processor 208 accesses the control policy 302 from the memory device 208 and evaluates the control policy 302 for expired, corrupted, or malicious instructions in a validity determination. In performing the validity determination and enforcement of the control policy, the hardware processor 208 performs s518 to s530 which have already been discussed in detail.

Turning again to FIG. 6, the mobile computing device 200 is initially in a powered on state (s600) and the processor is executing the OSRPM 308. Under the control of the OSRPM 308, the mobile computing device 200 establishes communication over the network 120 with a remote device/process 170 (s606). Using the communication interface 224 and under the control of the OSRPM 308, the hardware processor 204 retrieves the control policy 302 from the remote device/process 170 (s608), stores the control policy 302 in the memory device 208 (s610), and evaluates the control policy 302 for expired, corrupted, or malicious instructions in determining its validity (s612). Receipt and storage of the control policy can also include performing a decryption process using the encryption keys 314 stored in memory 208. The validity determination and the resulting enforcement actions have already been discussed in detail with respect to s614 to s632.

Figure 7:
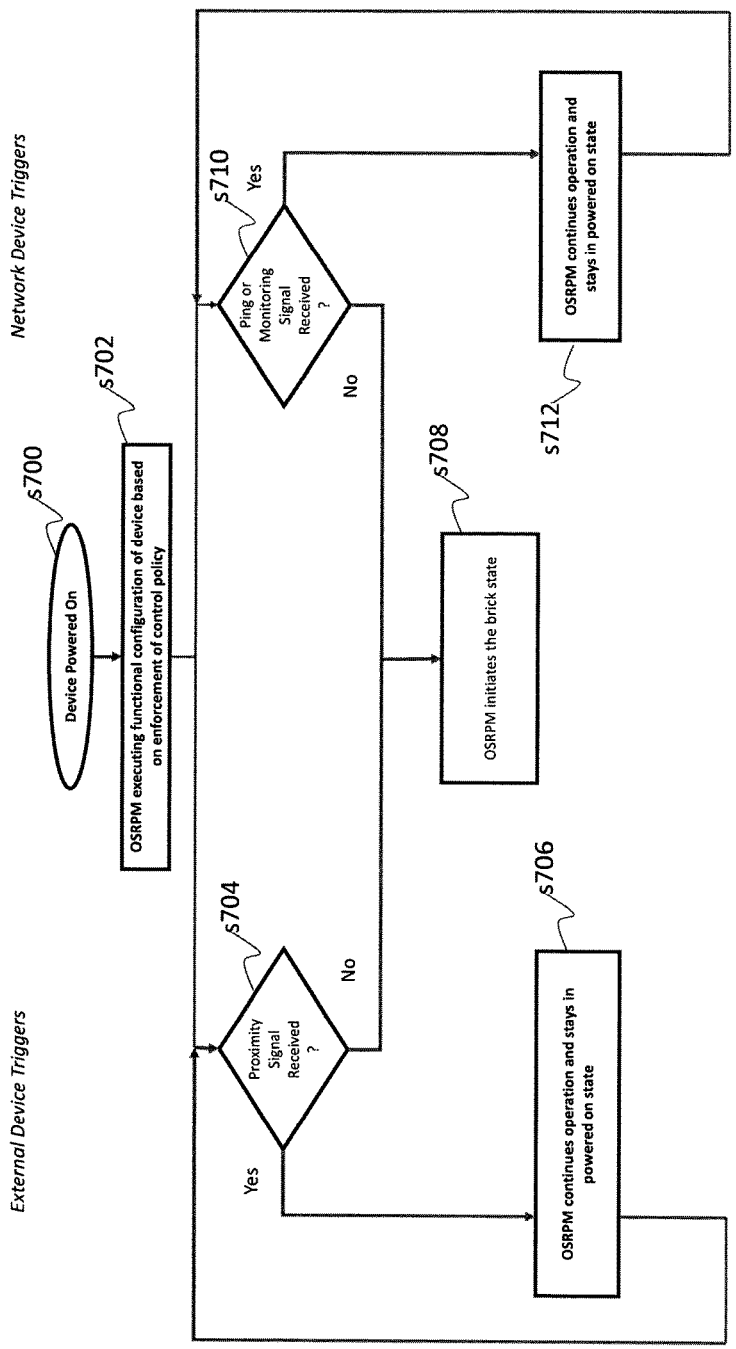
FIG. 7 illustrates a method of placing the mobile computing device in a brick state in accordance with an exemplary embodiment of the present disclosure.

FIG. 7 illustrates a method of placing the mobile computing device in a brick state in accordance with an exemplary embodiment of the present disclosure.

As shown in FIG. 7, the mobile computing system is in a powered on state (s700) and under the control of the OSRPM 308 following enforcement of the control policy 302 (s702). If the control policy enforcement was initiated by an external device trigger, then the OSRPM 308 monitors whether a proximity signal or other suitable monitoring signal from the external device 140 has been received (s704). If the proximity signal has been received, the OSRPM continues its current operation, keeps the mobile computing device in the powered on state, returns for next instance of proximity signal (or monitoring signal) detection (s706). On the other hand, if the proximity signal has not been received, the OSRPM 308 enters the brick state in which all executable operations are suspended and/or the OSRPM 308 initiates a power off of the mobile computing device (s708).

If the control policy enforcement was initiated by a network device trigger, then the OSRPM 308 monitors whether a control or monitoring signal from the remote device/process 170 has been received (s710). If the control or monitoring signal has been received, the OSRPM continues its current operation, keeps the mobile computing device in the powered on state, returns for next instance of control or monitoring signal detection (s712). On the other hand, if the control or monitoring signal has not been received, the OSRPM 308 enters the brick state (s708).

The operations performed by the remote device/process 170 described herein can be at least partially processor-implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Exemplary embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on the remote device/process using one computer or multiple computers at one site or distributed across multiple sites and interconnected by a communication network.

According to an exemplary embodiment, operations can be performed at the remote device/process 170 by one or more programmable processors executing a computer program to perform functions by operating on input data and generating output. Exemplary method operations can also be performed by, and example apparatus can be implemented as, special purpose logic circuitry (e.g., a field programmable gate array (FPGA) or an application-specific integrated circuit (ASIC)).

The present disclosure provides that different operations can be performed with the mobile computing device 200 based on the mobile computing device's 200 presence in different areas having different security designations. For example, the mobile computing device 200 (abbreviated as "host") can be outside an allowed area or geographic location, enter an unsecured allowed area or geographic location, enter a secured allowed area or geographic location, and leave an allowed area or geographic location. For each of these areas, the RFID reader 100, the RFID component 210 and the hardware processor 204 of the mobile computing device 200 executes the above-described software dedicated to interface with the RFID component 210, an external device 140 over a wired or wireless connection, and/or a remote device/process 170 over a network.

In accordance with other exemplary embodiments of the present disclosure, a computer readable medium can have program or software code stored thereon such that when in communicable contact with a processor of a computer or computing device, the program causes the processor to perform any of the methods and processes described herein. For example, the computer readable medium can include a hard disk drive, floppy disk drive, magnetic tape drive, optical disk drive, solid state drive, or other suitable non-transitory computer readable storage device as desired. In some embodiments, the memory unit can be removable storage (e.g., flash memory, a compact disc, digital versatile disc, Blu-ray disc, etc.) or a combination of non-removable and removable storage. In an exemplary embodiment, the memory unit can be external to the computing system and accessed via a network by a communications interface, discussed in more detail below, such as cloud storage. The memory unit may include random access memory (RAM), read-only memory (ROM), or a combination thereof. Suitable types and configurations of the memory unit will be apparent to persons having skill in the relevant art.

While various exemplary embodiments of the disclosed system and method have been described above, it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

As can be seen above, the application providing method and system can be implemented in any number of ways as discussed above, or as will become apparent to those skilled in the art after reading this disclosure. These embodiments, as well as variations and modifications thereof, which will occur to those skilled in the art, are encompassed by the application providing method and system. Hence, the scope of the application providing method and system is limited only by the metes and bounds as articulated in the claims appended hereto.

What is claimed is:

1. A mobile computing device comprising:
   a memory device for storing a control policy defining a functional configuration of the mobile computing device;
   a processor configured to place the mobile computing device in one of plural states based on a validation result of the control policy;
   an RFID component including an RF transceiver and RFID memory, wherein the memory device includes the RFID memory;
   a power controller configured for controlling a power state of the mobile computing device,
   wherein the processor is configured to:
      execute an operating system runtime policy module (OSRPM) for retrieving the control policy from the RFID memory and evaluating the control policy for expired, corrupted, or malicious instructions; and
      execute a power control module for communicating with the power controller,
   wherein when the control policy is valid, the processor is configured to:
      determine, via the OSRPM, whether the control policy allows a power on state; and
      when the control policy allows a power on state, keep the power controller in a power on state; or
      when the control policy does not allow the power on state:
         control the power controller to enter a power off state and stop communication between the OSRPM and the power control module; and
         force the power controller to power off via the power control module.

2. The mobile computing device according to claim 1, wherein during a boot sequence the processor is configured to execute a first firmware application for retrieving the control policy from the RFID memory and evaluating the control policy for expired, corrupted, or malicious instructions.

3. The mobile computing device according to claim 2, wherein when the control policy is valid, the processor is configured to execute the first application for:
determining whether a valid control policy allows boot up of the mobile computing device; and
when boot up is allowed, initiating an operating system (OS) application; or
when boot up is not allowed, controlling the power controller to enter a power off state.

4. The mobile computing device according to claim 2, wherein when the control policy is not valid, the processor is configured to execute the first firmware application for:
determining whether a wipe threshold is expired; and
when the wipe threshold is exceeded, dumping encryption keys from trusted memory and initiating a disk wipe; or
when the wipe threshold is not expired, controlling the power controller to enter a power off state.

5. The mobile computing device according to claim 1, wherein when the control policy is not valid, the processor is configured to determine whether a wipe threshold is expired via the power control module, and when the wipe threshold is expired, the processor is configured to:
execute the OSRPM to initiate a reboot of the mobile computing device and stop communication with the power control module;
execute the boot control program;
initiate the first boot loader in the boot control program; and
dump encryption keys from trusted memory and initiate a disk wipe via the first boot loader.

6. The mobile computing device according to claim 1, comprising:
an interface for communicating with remote devices on a network,
wherein during a boot sequence the processor is configured to execute a first firmware application the processor for retrieving the control policy from a remote device on the network, storing the control policy in the memory device, and evaluating the control policy for expired, corrupted, or malicious instructions.

7. The mobile computing device according to claim 6, wherein when the control policy is valid, the processor is configured to execute the first firmware application for:
determining whether a valid control policy allows boot up of the mobile computing device; and
when boot up is allowed, initiating an operating system (OS) application; or
when boot up is not allowed, controlling the power controller to enter a power off state.

8. The mobile computing device according to claim 6, wherein when the control policy is not valid, the processor is configured to execute the first firmware application for:
determining whether a wipe threshold is expired; and
when the wipe threshold is expired, dumping encryption keys from trusted memory and initiating a disk wipe; or
when the wipe threshold is not expired, controlling the power controller (120) to enter a power off state.

9. A mobile computing device, comprising:
a memory device for storing a control policy defining a functional configuration of the mobile computing device;
an RFID component and RFID memory, wherein the memory device includes the RFID memory;
a processor configured to place the mobile computing device in one of one of plural states based on a validation result of the control policy;
a power controller configured for controlling a power state of the mobile computing device; and
an interface for communicating with remote devices on a network,
wherein the processor is configured to execute an operating system runtime policy module (OSRPM) for retrieving the control policy from the RFID memory or a remote device on the network, storing the control policy in the memory device when retrieved from the remote device, execute a power control module for communicating with the power controller, and evaluating the control policy for expired, corrupted, or malicious instructions,
wherein when the control policy is valid, the processor is configured to:
determine, via the OSRPM, whether the control policy allows a power on state; and
when the control policy allows a power on state, keep the power controller in a power on state; or
when the control policy does not allow the power on state:
control the power controller to enter a power off state and stop communication between the OSRPM and the power control module; and
force the power controller to power off via the power control module.

10. The mobile computing device according to claim 9, comprising:
wherein when the control policy is valid, the processor is configured to execute a first firmware application for:
determining whether a valid control policy allows boot up of the mobile computing device; and
when boot up is allowed, initiating an operating system (OS) application; or
when boot up is not allowed, controlling the power controller to enter a power off state.

11. The mobile computing device according to claim 9, wherein if the control policy is not valid, the processor is configured to execute a first firmware application for:
determining whether a wipe threshold is expired; and
when the wipe threshold is exceeded, dumping encryption keys from trusted memory and initiating a disk wipe; or
when the wipe threshold is not expired, controlling the power controller to enter a power off state.

12. The mobile computing device according to claim 9, wherein when the control policy is not valid, the processor is configured to determine whether a wipe threshold is expired via the power control module, and when the wipe threshold is expired, the processor is configured to:
execute the OSRPM to initiate a reboot of the mobile computing device and stop communication with the power control module;
execute a boot control program;
initiate a first firmware application in the boot control program; and
dump encryption keys from trusted memory and initiate a disk wipe via the first firmware application.

13. A method of controlling a power state of a mobile computing device, the mobile computing device having a memory device and a processor configured to execute the method via at least one of a plurality of programming modules, wherein the mobile computing device includes an RFID component and a power controller, the memory device includes an RFID memory of the RFID component, and the plurality of programming modules includes an operating system runtime policy module (OSRPM) for execution by the processor and a power control module for execution by the processor to control a power state of the power controller, the method comprising:
storing a control policy in the memory device, the control policy defining a functional configuration of the mobile computing device;
retrieving the control policy from the memory device for validation; and
placing the mobile computing device in one of plural states based on whether the control policy is valid,
retrieving the control policy from the RFID memory for validation via the OSRPM,
wherein validation of the control policy comprises:
determining, via the OSRPM, whether the control policy includes at least one of expired, corrupted, and malicious instructions, and
when the control policy is valid:
determining, via the OSRPM whether a valid control policy allows a power on state of the mobile computing device; and
maintaining the power on state via the OSRPM if allowed by the control policy; or
via the OSRPM, initiating a power off event and stopping communication between the OSRPM and the power control module; and
pulling power from the power controller via the power control module.

14. The method according to claim 13, wherein the plurality of programming modules includes a boot control program for execution by the processor, the method comprising:
executing the boot control program to initiate boot up of the mobile computing device; and
executing a first firmware application in a boot sequence of the boot control program,
wherein retrieving the control policy from the memory device, comprises:
requesting, via the first firmware application, the control policy stored in the RFID memory.

15. The method according to claim 14, comprising:
determining whether a valid control policy allows boot up of the mobile computing device; and
when boot up of the mobile computing device is allowed, initiating an operating system (OS) application via the first firmware application; or
when boot up of the mobile computing device is not allowed, forcing a power off of the mobile computing device via the first firmware application.

16. The method according to claim 14, comprising:
determining whether a wipe threshold has expired; and
when the control policy is not valid and the wipe threshold is expired:
dumping encryption keys from trusted memory via the first firmware application; and
initiating a disk wipe via the first firmware application program; or
when the control policy is not valid and the wipe threshold is not expired:
forcing a power off of the mobile computing device via the first firmware application.

17. The method according to claim 14, wherein:
when a wipe threshold is expired and the control policy is not valid, the method comprising:
via the OSRPM, initiating a reboot of the mobile computing device and stopping communication with the power control module;
executing the boot sequence via the boot control program;
initiating the first firmware application via the boot control program; and
via the first firmware application, dumping encryption keys from trusted memory via the first firmware application and initiating a disk wipe via the first firmware application; or
when the wipe threshold is not expired and the control policy is not valid, the method comprising:
via the OSRPM, initiating a power off event and stopping communication between the OSRPM and the power control module; and
pulling power from the power controller via the power control module,
wherein the wipe threshold defines a maximum allowed elapsed time since a last communication between the OSRPM and the power control module.

* * * * *